US008600869B1

(12) United States Patent
Rotman

(10) Patent No.: US 8,600,869 B1
(45) Date of Patent: Dec. 3, 2013

(54) SYSTEM AND METHOD FOR ASSIGNING A LINE OF CREDIT TO A CREDIT CARD ACCOUNT

(75) Inventor: Frank Rotman, Richmond, VA (US)

(73) Assignee: Capital One Financial Corporation, McLean, VA (US)

( * ) Notice: Subject to any disclaimer, the term of this patent is extended or adjusted under 35 U.S.C. 154(b) by 428 days.

(21) Appl. No.: 09/386,160

(22) Filed: Aug. 31, 1999

(51) Int. Cl.
*G06Q 40/00* (2012.01)

(52) U.S. Cl.
USPC ........... 705/38; 705/35; 705/36 R; 705/39; 705/40

(58) Field of Classification Search
USPC ........... 705/35, 38, 39, 40, 41, 42, 43, 36 R; 235/379, 380
See application file for complete search history.

(56) References Cited

U.S. PATENT DOCUMENTS

| | | | |
|---|---|---|---|
| 4,597,046 A | 6/1986 | Musmanno et al. | 705/38 |
| 4,718,009 A | 1/1988 | Cuervo | 705/38 |
| 4,812,628 A | 3/1989 | Boston et al. | 235/380 |
| 5,231,569 A | 7/1993 | Myatt et al. | 705/38 |
| 5,615,408 A * | 3/1997 | Johnson et al. | 455/33.1 |
| 5,950,179 A * | 9/1999 | Buchanan et al. | 705/38 |
| 5,988,497 A * | 11/1999 | Wallace | 235/382.5 |
| 6,567,791 B2 * | 5/2003 | Lent et al. | 705/38 |

FOREIGN PATENT DOCUMENTS

| | | |
|---|---|---|
| EP | 0485090 A2 | 5/1992 |
| WO | WO 98/54667 | 12/1998 |

OTHER PUBLICATIONS

"Transamerica to Launch Credit Plan", computer Reseller News, n712, p. 10, Nov. 25, 1996.*
"Sears Tests Starter Card", Card Fax, v1997, n21, p1, Jan. 28, 1997.*
"Sure Card Inc: South Florida Resident Become 2,000,000th Person to Request Sure Card From South Florida Based National Credit Card Issuer", Business Wire, Jun. 27, 1990.*
"Credit card issuers raise debt limits", USA Today, pB1, Nov. 28, 1994.*
"Keeping Tabs on Card Holders", The Washington Post, pH1, Jan. 20, 1991.*
Radding, Alan, "Credit Scoring's New Frontier", Credit Card Management, v5n8, pp. 71-78, Sep. 1992.*
"Buy Now, Pay Later: Discounters Offering Plastic to Lure Buyers", Women's Wear Daily, v173, n24, p1 +, Feb. 5, 1997.*
Atkinson, Jarrell A., "Giving Credit Where It's Due", Small Business Reports, v1 7n8, pp. 15-19, Jun. 1992.*
"Bankers urged to monitor card portfolios as bankrupcies rise", ABA Retail Banker International, v47, p. 2-3, Jan 1987.*
"Education a Perk in New AT&T College Credit Card Offer", Card News, v8, n18, pN/A, Aug. 23, 1993.*
"EDS Segmenting Consumer Characteristics to Determine Risk Potential for GM Card", Credit Risk Management Report, v2, n23, pN/A, Nov. 23, 1992.*

(Continued)

*Primary Examiner* — Nga B. Nguyen
(74) *Attorney, Agent, or Firm* — Finnegan, Henderson, Farabow, Garrett & Dunner, LLP

(57) ABSTRACT

A system assigns a credit limit to an account for a credit card of a card holder based on whether the card holder poses an acceptable risk. The system activates an account for the credit card, assigns an initial credit limit well below a tolerance level to the account, develops credit history data based on account activity during predetermined short intervals of time, evaluates the credit history data after each of the predetermined short time intervals, and determines whether to increase the credit limit of the account based on the evaluated credit history.

20 Claims, 4 Drawing Sheets

(56) References Cited

OTHER PUBLICATIONS

"Sure Card Inc: South Florida Resident Become . . ." Business Wire, Jun. 27, 1990.*

Radding, Alan, "Credit Scoring's New Frontier", Credit Card Management, v4n5, pp. 71-76; Sep. 1992.*

Marshall, Jeffrey, "Zap—The Computer Lops Off Another Bad Risk", United States Banker v102n8, pp. 49-60, Aug. 1992.*

Morrall, Katherine, "Profits by the Numbers", Bankers Monthly, v108n11, pp. 25-29, Nov. 1991.*

* cited by examiner

SYSTEM AND METHOD FOR ASSIGNING A LINE OF CREDIT TO A CREDIT CARD ACCOUNT

FIELD OF THE INVENTION

The present invention is directed to credit card systems and, more particularly, to systems and methods that reduce the risk to credit card issuers by providing low initial credit limits and frequent evaluations of their credit card holders.

BACKGROUND OF THE INVENTION

Conventional systems assign credit limits to customers in a two step process. First, a credit card issuer identifies potential customers based on information from credit bureaus, such as past credit history, prior declarations of bankruptcy, and the like. Once the issuer identifies the potential customers, it offers its credit card to them. The credit card offer typically extends high limits with its credit card accounts to the potential customers, such as $10,000-20,000. The issuer usually selects a credit limit equal to a tolerance level (i.e., an amount the issuer can afford to risk on a potential customer). The issuer then issues credit cards to those customers who accept the offer.

Second, after some long period of time, such as one to two years, the issuer considers whether to increase a customer's credit card limit by studying the customer's past performance. If the customer has made timely payments in the past, for example, the issuer usually increases the credit limit. Otherwise, the issuer holds the credit limit at its current level.

Two problems exist with the conventional systems. First, the credit card issuer typically grants high initial credit limits based solely on credit bureau information. While not questioning the accuracy of this information, past performance does not dictate future conduct. In other words, even a credit card holder with an exemplary credit record might use all of the initial credit without making any payments. As a result, the issuer would need to take action to recover its money, an act that might be futile if the card holder files for bankruptcy.

A second problem involves the long time period before granting a credit limit increase. Because the initial credit limit is typically large, credit card issuers usually wait a long period of time before even considering a credit limit increase. This might result in a loss of customers, if customers' requests for credit limit increases are denied.

Therefore, a need exists for assigning credit limits that minimize the risk to credit card issuers and that provide for rapid evaluations and credit limit increases.

SUMMARY OF THE INVENTION

Systems and methods consistent with the present invention address this need by initially assigning low credit limits to new credit card accounts and by evaluating and increasing the credit limits within relatively short periods of time.

A system consistent with the present invention assigns a credit limit to a credit card issued to a card holder based on whether the card holder poses an acceptable risk. The system activates an account for the credit card, assigns an initial credit limit well below a tolerance level to the account, develops credit history data based on account activity during predetermined short intervals of time, evaluates the credit history data after each of the predetermined short time intervals, and determines whether to increase the credit limit of the account based on the evaluated credit history.

BRIEF DESCRIPTION OF THE DRAWINGS

The accompanying drawings, which are incorporated in and constitute a part of this specification, illustrate an embodiment of the invention and, together with the description, explain the invention. In the drawings.

DETAILED DESCRIPTION

The following detailed description of the invention refers to the accompanying drawings. The same reference numbers in different drawings identify the same or similar elements. Also, the following detailed description does not limit the invention. Instead, the scope of the invention is defined by the appended claims and equivalents.

Systems and methods consistent with the present invention protect credit card issuers while addressing the needs of its card holders by initially assigning low credit limits to new credit card accounts and evaluating and increasing the limits at regular time intervals. This limits the risk to issuers until such time that they can learn more about the credit card holders while, on the other hand, permitting credit card holders to build a favorable credit history.

System Description

Figure 1:
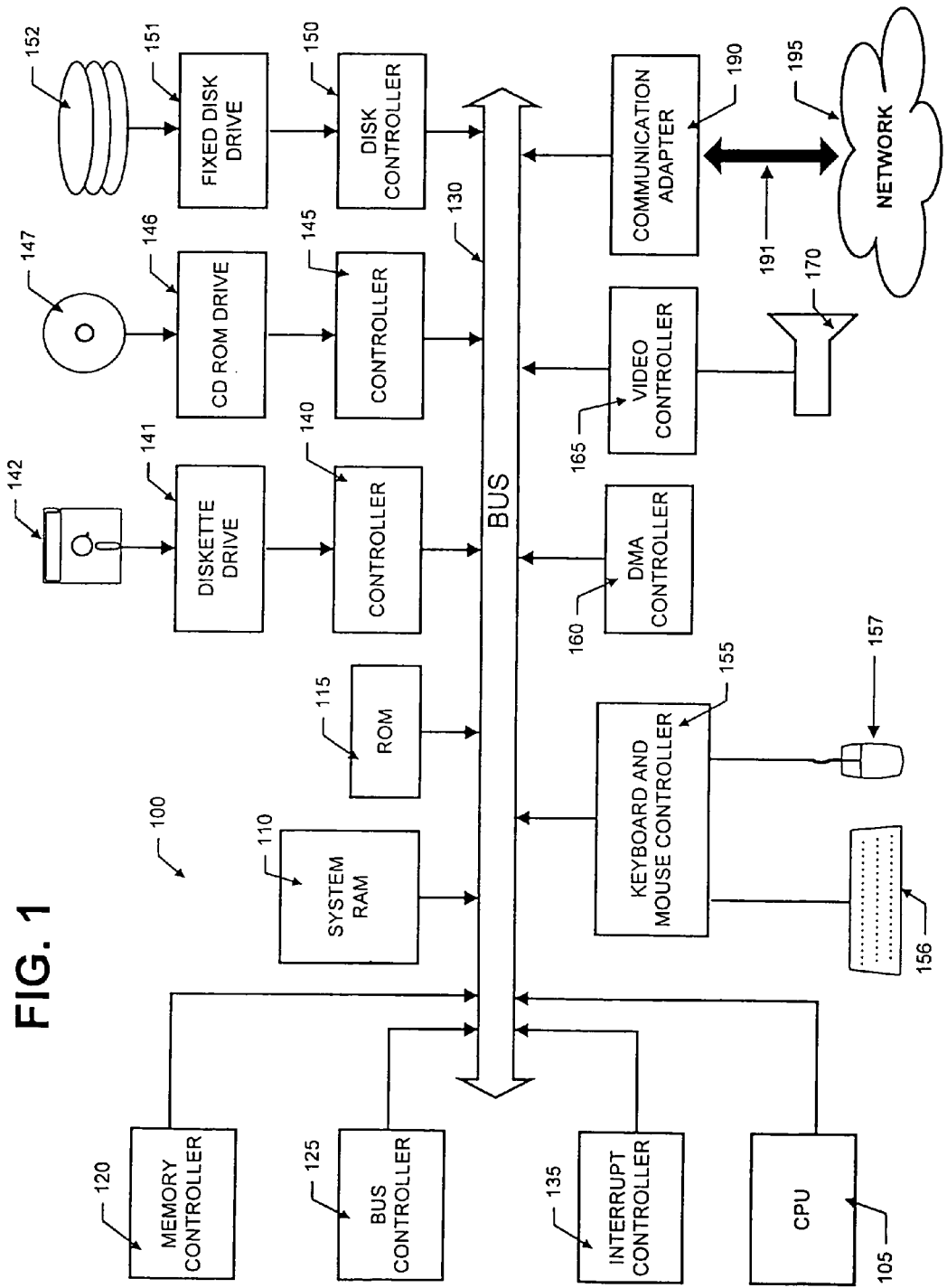
FIG. 1 is a diagram of a computer system consistent with the present invention.

FIG. 1 is a diagram of a system architecture for a computer system with which the invention may be implemented. The exemplary computer system of FIG. 1 is for descriptive purposes only. Although the description may refer to terms commonly used in describing particular computer systems, such as an IBM PS/2 personal computer, the description and concepts equally apply to other computer systems, such as network computers, workstations, and even mainframe computers having architectures dissimilar to FIG. 1.

Computer system 100 includes a central processing unit (CPU) 105, which may be implemented with a conventional microprocessor, a random access memory (RAM) 110 for temporary storage of information, and a read only memory (ROM) 115 for permanent storage of information. A memory controller 120 controls the RAM 110.

A bus 130 interconnects the components of computer system 100. A bus controller 125 controls the bus 130. An interrupt controller 135 receives and processes various interrupt signals from the system components.

Mass storage may be provided by diskette 142, CD ROM 147, or hard drive 152. Data and software may be exchanged with computer system 100 via removable media such as diskette 142 and CD ROM 147. Diskette 142 inserts into diskette drive 141 which, in turn, connects to bus 130 via a controller 140. Similarly, CD ROM 147 inserts into CD ROM drive 146 which, in turn, connects to bus 130 via controller 145. Hard disk 152 is part of a fixed disk drive 151 that connects to bus 130 by controller 150.

User input to computer system 100 may be provided by a number of devices. For example, a keyboard 156 and mouse 157 connect to bus 130 via controller 155. It will be obvious to those reasonably skilled in the art that other input devices, such as a pen, a tablet, or speech recognition mechanisms, may connect to bus 130 and an appropriate controller and software, as required. A direct memory access (DMA) controller 160 performs direct memory access to RAM 110. User output may be generated by a video controller 165 that controls video display 170.

Computer system 100 also includes a communications adaptor 190 that allows the system to be interconnected to additional computing resources via a local area network (LAN) or a wide area network (WAN), such as the Internet, schematically illustrated by bus 191 and network 195. Signals traveling through network 195 can generally be referred to as "carrier waves" that transport information. Although aspects of the present invention are described as being stored in memory in the form of instructions, one skilled in the art will appreciate that those aspects may be stored on other computer-readable media, such as secondary storage devices like hard disks, floppy disks, or CD ROM, or other forms of RAM or ROM, or a carrier wave.

Operation of computer system 100 is generally controlled and coordinated by operating system software. The operating system controls allocation of system resources and performs tasks, such as memory management, process scheduling, networking, and services, among other things.

Figure 2:
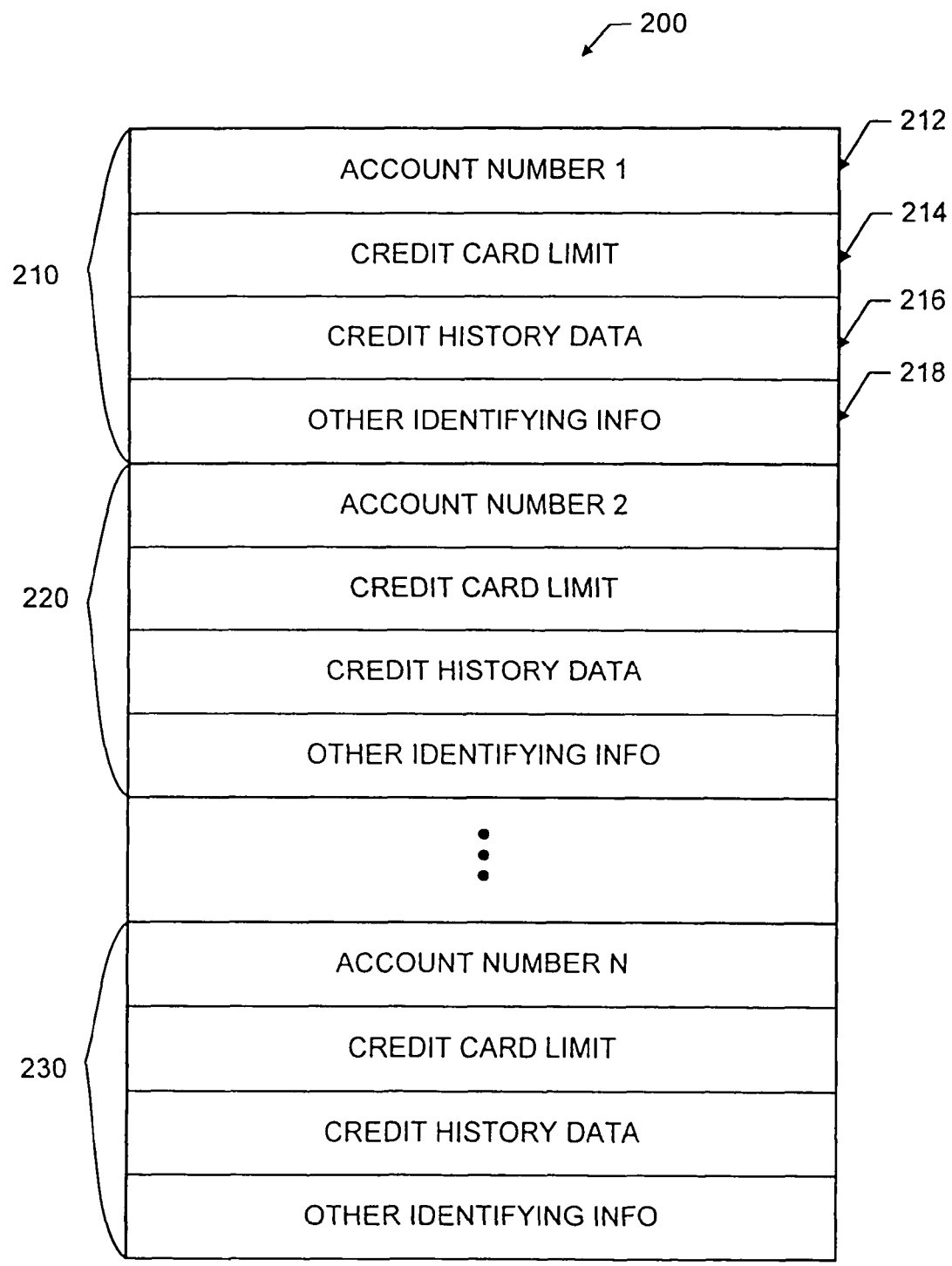
FIG. 2 is a diagram of contents of a memory consistent with the present invention.

FIG. 2 is a diagram of memory 200 consistent with the present invention. Memory 200 may include system RAM 110 (FIG. 1), but may alternatively include other types of memories including any of the memories shown in FIG. 1.

Memory 200 includes a database that stores information regarding several accounts 210, 220, and 230. Account 210, for example, includes an account number 212, a credit card limit 214, credit history data 216, and other identifying information 218. The account number 212 identifies a credit card account of a card holder. The credit card limit 214 identifies the amount of credit extended to the account. The credit history data 216 includes account history information and will be described below with reference to FIG. 3. The other identifying information 218 includes information regarding the card holder, such as the card holder's name, address, and telephone number, and other similar identifying information.

Exemplary Credit History Data

Figure 3:
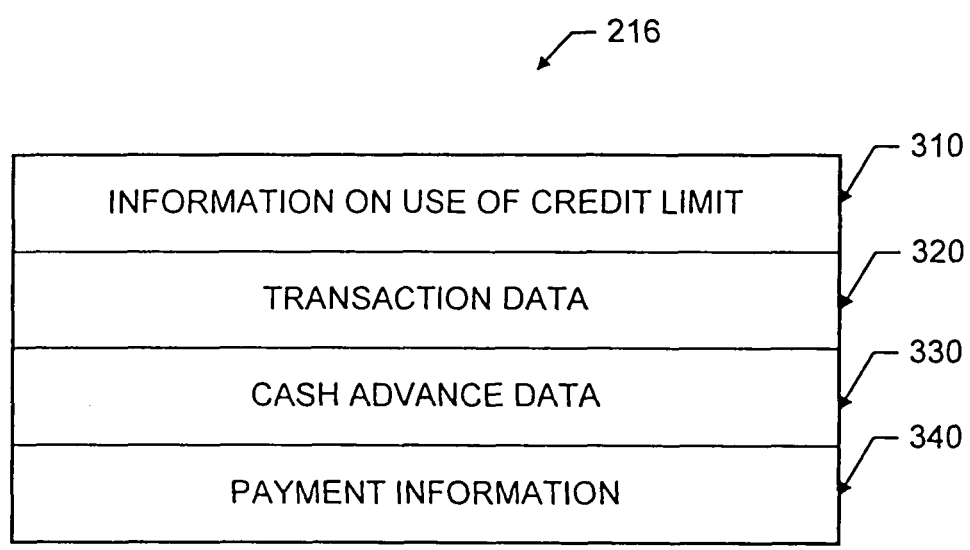
FIG. 3 is a diagram of credit history data in the memory of FIG. 2.

FIG. 3 is a diagram of credit history data 216 consistent with the present invention. The credit history data 216 includes information on the use of the extended credit limit 310, transaction data 320, cash advance data 330, and payment information 340. Of course, the account data may include additional information regarding the credit history of the card holder.

The information on the use of the extended credit limit 310 includes data regarding the manner in which the card holder has used the given credit limit, such as whether the card holder used all or most of the credit limit and how quickly the card holder did this after receiving the credit card. A card holder that quickly uses most of the extended credit limit may pose a greater credit risk than a card holder that uses only a portion of the extended credit limit. The transaction data 320 includes data regarding the types of transactions for which the credit card was used by the card holder. Certain types of transactions may indicate that the card holder poses a credit risk.

The cash advance data 330 includes data regarding the frequency of any cash advances obtained using the credit card. A large number of cash advances by a card holder may indicate that the card holder poses a credit risk. The payment information 340 includes data regarding the number of late or missed payments by the card holder and the amount of initial payments by the card holder. A card holder that routinely pays late or misses payment poses a credit risk. Also, a card holder that makes only minimum payments also poses a credit risk.

The credit card issuer uses the credit history data 216 to determine whether to increase a credit limit of an account in a manner described below.

System Operation

Figure 4:
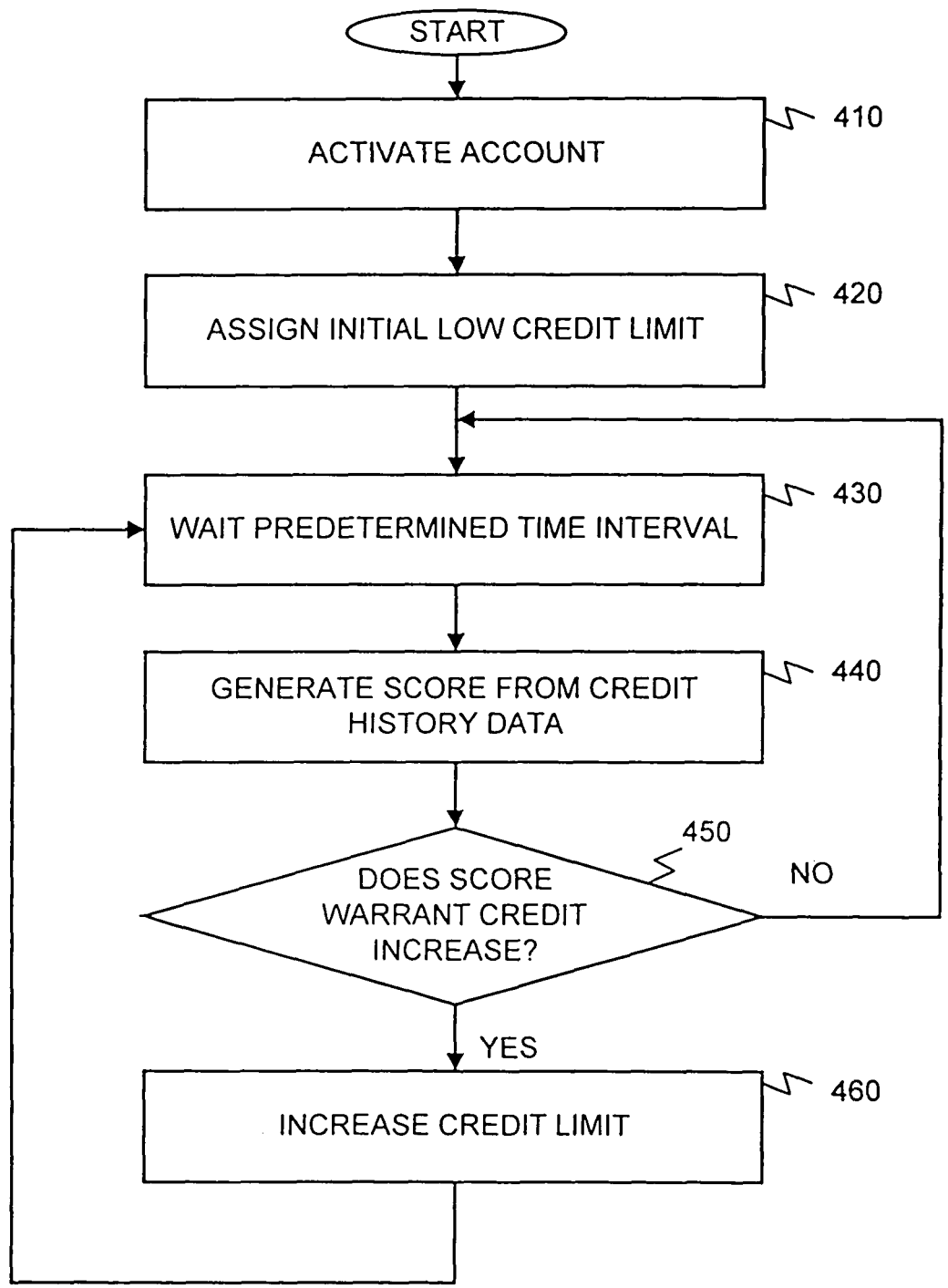
FIG. 4 is a flowchart of processing for assigning and evaluating a credit limit in a manner consistent with the present invention.

FIG. 4 is a flowchart of processing for assigning a credit limit in a manner consistent with the present invention. The credit card issuer selects potential customers in a manner similar to the way conventional systems make the selection. That is, the issuer identifies potential customers that pose a reasonable risk based on information provided by a credit bureau. For example, the issuer identifies potential customers based on their past credit history, prior declarations of bankruptcy, etc. The issuer then offers its credit card to the potential customers.

For those customers that accept the offer, the issuer activates new accounts for them [step 410]. The issuer initially assigns a low credit limit, such as a $1,000 limit, to each account [step 420]. Unlike the high credit limit assigned by conventional systems, the low credit limit is well below a degree of tolerance (i.e., an amount the issuer can afford to risk on a customer) to minimize the issuer's risk.

The issuer then waits a predetermined short time interval, such as a two month interval, to collect credit history data corresponding to the accounts [step 430]. After the predetermined short time interval, the issuer, without human intervention, evaluates the credit history data for each account to generate a score for the account [step 440]. The issuer generates the score based on one or more of the following information: (1) the manner in which the customer used the given credit limit; (2) the types of transactions for which the customer used the credit card; (3) whether the customer made any cash advances; (4) the number of late or missed payments by the customer; (5) the amount of the initial payments by the customer; (6) credit bureau information; etc.

From the generated score, the issuer determines whether to increase the credit limit assigned to an account [step 450]. If the score is above some predetermined threshold, the issuer increases the credit limit assigned to the account by a determined amount [step 460]. The issuer then waits for another time interval to lapse [step 430] before it reevaluates the credit history data for each account [step 440]. If the score is below the predetermined threshold, the issuer denies the credit limit increase and waits for another time interval to lapse [step 430] before reevaluating the credit history data for each account [step 440].

In this manner, the credit card issuer minimizes its risk by keeping the credit limit low until it has time to learn more about the spending habits of the card holder. If the card holder poses an acceptable risk, as determined at regular intervals, the issuer quickly increases the card holder's credit limit.

The foregoing description of preferred embodiments of the present invention provides illustration and description, but is not intended to be exhaustive or to limit the invention to the precise form disclosed. Modifications and variations are possible in light of the above teachings or may be acquired from practice of the invention. The scope of the invention is defined by the claims and their equivalents.

What is claimed is:

1. A method, implemented by a computer, for managing a credit limit for a credit card issued to a card holder, comprising:
   activating an account for the credit card;
   assigning an initial credit limit to the account, the initial credit limit being below a tolerance level for the card holder;
   developing credit history data based on the card holder's use of the account during respective predetermined short intervals of time, wherein the card holder's use of the account is based on each transaction made by the card holder with the credit card during the respective predetermined short interval of time and reflects at least a manner in which the card holder used the credit limit, wherein the manner includes: whether the card holder used all or most of the initial credit limit, and if so, how quickly the card holder used all or most of the initial credit limit;
   evaluating, by the computer, the developed credit history data after each of the predetermined short time intervals by generating a score based on the card holder's use of the account over each respective predetermined short time interval; and
   deciding, by the computer, whether to increase the credit limit of the account based on the score generated from evaluating the developed credit history.

2. The method of claim 1, wherein the evaluating includes:
   obtaining information from a credit bureau regarding the card holder.

3. The method of claim 1, wherein the evaluating and deciding are performed without any human intervention.

4. A data processing system comprising:
   a memory including instructions for activating an account for the credit card;
   instructions for assigning an initial credit limit to the account, the initial credit limit being below a tolerance level for the card holder;
   instructions for developing credit history data based on the card holder's use of the account during respective predetermined short intervals of time, wherein the card holder's use of the account is based on each transaction made by the card holder with the credit card during the respective predetermined short interval of time and reflects at least a manner in which the card holder used the credit limit, wherein the manner includes: whether the card holder used all or most of the initial credit limit, and if so, how quickly the card holder used all or most of the initial credit limit;
   instructions for evaluating the developed credit history data after each of the predetermined short time intervals by generating a score based on the card holder's use of the account over each respective predetermined short time interval; and
   instructions for deciding whether to increase the credit limit of the account based on the score generated from evaluating the developed credit history; and
   a processor for executing the instructions in the memory.

5. A data processing system comprising:
   a memory including
   an account number structure storing account information corresponding to a plurality of credit card accounts;
   a credit limit structure storing credit limit information corresponding to each of the credit card accounts;
   a credit history structure storing information relating to the card holder's use of the account during a respective predetermined time interval for each of the credit card accounts, wherein the card holder's use of the account is based on each transaction made by the card holder with the credit card during the respective predetermined short interval of time and reflects at least a manner in which the card holder used the credit limit, wherein the manner includes: whether the card holder used all or most of the initial credit limit, and if so, how quickly the card holder used all or most of the initial credit limit; and
   a processor that activates an account for a credit card and stores account number information corresponding to the account in the account number structure, assigns to the account an initial credit limit below a tolerance level for the card holder and stores the initial credit limit in the credit limit structure, evaluates the developed credit history information in the credit history structure after the predetermined time interval by generating a score based only on the card holder's use of the account over each respective predetermined short time interval, and determines whether to increase the credit limit of the account based on the score generated from evaluating the developed credit history.

6. The method of claim 1, wherein the short interval of time covers a predetermined number of payment cycles reflecting less than one year of the card holder's use of the account.

7. The method of claim 1, wherein the tolerance level is based on an industry standard level of risk associated with the card holder.

8. The data processing system of claim 4, wherein the short interval of time covers a predetermined number of payment cycles reflecting less than one year of the card holder's use of the account.

9. The data processing system of claim 4, wherein the tolerance level is based on an industry standard level of risk associated with the card holder.

10. The method of claim 1, wherein the tolerance level is based on the card holder's credit history.

11. The data processing system of claim 4, wherein the tolerance level is based on the card holder's credit history.

12. The method of claim 1, wherein the credit card is issued by a credit card issuer, and the evaluated credit history is developed by the credit card issuer.

13. The data processing system of claim 4, wherein the credit card is issued by a credit card issuer, and the evaluated credit history is developed by the credit card issuer.

14. The data processing system of claim 5, wherein the credit card is issued by a credit card issuer, and the evaluated credit history is developed by the credit card issuer.

15. The data processing system of claim 5, wherein the short interval of time covers a predetermined number of payment cycles reflecting less than one year of the card holder's use of the account.

16. The data processing system of claim 5, wherein the tolerance level is based on an industry standard level of risk associated with the card holder.

17. The data processing system of claim 5, wherein the tolerance level is based on the card holder's credit history.

18. The method of claim 1, wherein the card holder's use of the account further reflects at least one of: late or missing payments made by the card holder, cash advances requested by the card holder, types of purchase transactions made by the card holder, and the amount of initial payments made by the card holder to the account.

19. The data processing system of claim 4, wherein the card holder's use of the account further reflects at least one of: late or missing payments made by the card holder, cash advances requested by the card holder, types of purchase transactions made by the card holder, and the amount of initial payments made by the card holder to the account.

20. The data processing system of claim 5, wherein the card holder's use of the account further reflects at least one of: late or missing payments made by the card holder, cash advances requested by the card holder, types of purchase transactions made by the card holder, and the amount of initial payments made by the card holder to the account.

* * * * *